Oct. 2, 1951   F. P. QUINN   2,569,950
SNUBBED BOLSTER TRUCK

Filed May 22, 1946   2 Sheets-Sheet 1

INVENTOR.
Frank P. Quinn
BY
Atty.

Oct. 2, 1951 — F. P. QUINN — 2,569,950
SNUBBED BOLSTER TRUCK
Filed May 22, 1946 — 2 Sheets-Sheet 2
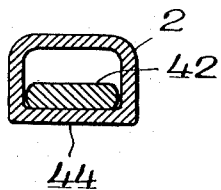
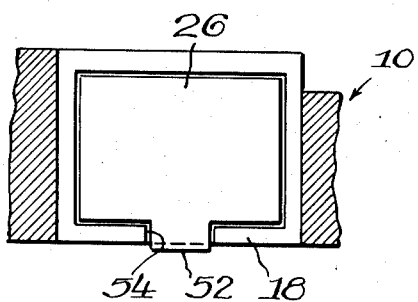
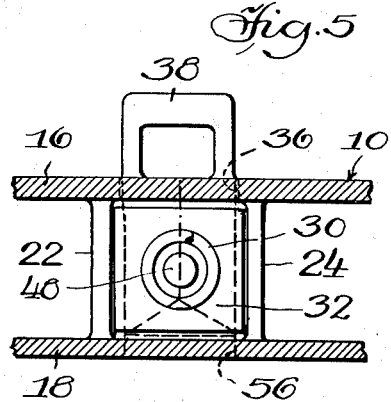
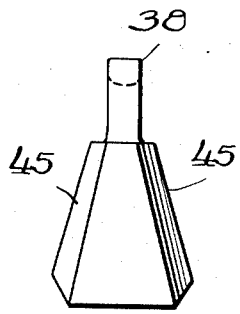
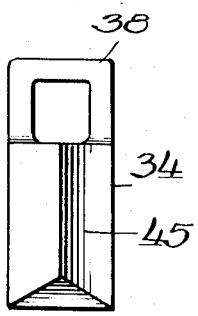
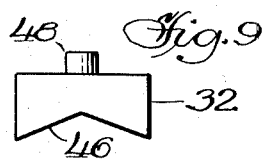
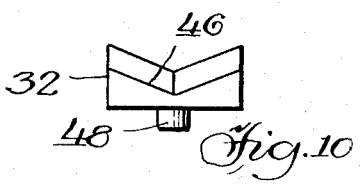
INVENTOR.
Frank P. Quinn,
BY
Orrin O. B. Garner
Atty.

Patented Oct. 2, 1951

2,569,950

UNITED STATES PATENT OFFICE 2,569,950

SNUBBED BOLSTER TRUCK

Frank P. Quinn, Chicago, Ill., assignor to American Steel Foundries, Chicago, Ill., a corporation of New Jersey Application May 22, 1946, Serial No. 671,462

4 Claims. (Cl. 105—197)

1

This invention relates to railway car trucks and more particularly to a truck comprising novel snubbing means for dampening oscillations of the truck bolster upon its supporting springs.

A general object of the invention is to design a truck incorporating novel snubbing means having relatively great capacity and comprising relatively great friction areas along which friction is developed to dampen bolster oscillations.

A more specific object of the invention is to provide a novel friction device wherein a pair of spaced friction members are disposed at each side of the bolster, resilient means being compressed between said friction members for urging one of said members into frictional engagement with a portion of the truck frame and for urging the other of said friction members into frictional engagement with a removable friction element secured to the truck frame and extending into the bolster through an opening in a wall thereof.

Still another object of the invention is to design a truck wherein the side frame is provided with a ride control wedge projecting through an opening in the top wall of the truck bolster, said wedge being in complementary wedge engagement at each side thereof with a wedge carried by the bolster and supporting a spring compressed against a friction shoe carried by the bolster and frictionally engaged with the associated side frame column. Thus, as the bolster moves downwardly on its supporting springs, the pressure of the friction shoe-actuated springs is increased as the central wedge mounted on the side frame urges the associated wedges within the bolster toward the respective friction shoes.

The foregoing and other objects and advantages of the invention will become apparent from a consideration of the following specification and accompanying drawings wherein:

Figure 3 is a sectional view taken in the transverse vertical plane indicated by the line 3—3 of Figure 1;

Figure 4 is a sectional view of the bolster taken in the transverse vertical plane indicated by the line 4—4 of Figure 2;

2

Figure 2:
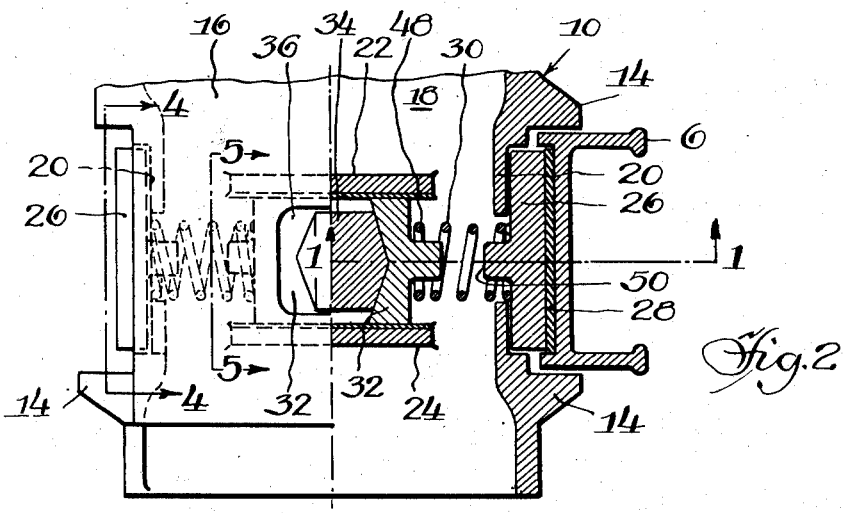
Figure 2 is a top plan view of the truck bolster and associated friction mechanism shown in Figure 1, a portion of the structure and one of the side frames columns being shown in section as indicated by the line 2—2 of Figure 1.

Figure 5 is a sectional view taken in the transverse vertical plane indicated by the line 5—5 of Figure 2;

Figures 6 and 7 illustrate in detail the frame-mounted ride control wedge, Figure 6 being a front view thereof and Figure 7 being a side elevation thereof; and Figures 8-10, inclusive, illustrate one of the bolster-mounted wedges, Figure 8 being a front elevational view thereof, Figure 9 being a top plan view thereof, and Figure 10 being a bottom plan view thereof.

Figure 1:
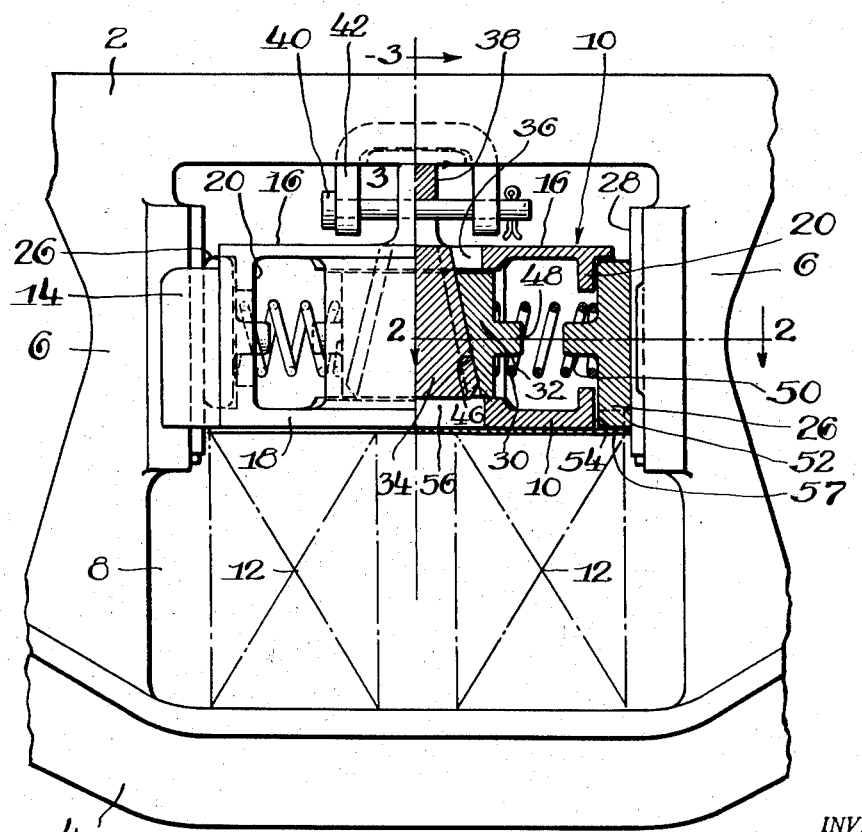
Figure 1 is a side elevation of a railway car truck embodying the invention, the ends of the side frame being broken off and a portion of the structure being shown in central vertical section as indicated by the line 1—1 of Figure 2.

Describing the invention in detail and referring first to Figures 1 and 2, the truck side frame is of conventional form and comprises a top compression member 2, a bottom tension member 4, and spaced columns 6 defining therewith a bolster opening 8 for the reception of a bolster, generally designated 10, and supported by a plurality of springs diagrammatically indicated at 12 (Figure 1). At each side thereof the bolster comprises inboard and outboard guide lugs 14 slidably engageable with the associated column 6 to afford an interlock therewith, the lugs 14 being of less depth than the widened lower portion of the bolster opening 8, as best seen in Figure 1, whereby, when the bolster-supporting springs 12 are removed from the bolster opening, the bolster may be lowered therein and removed therefrom.

The bolster 10 is a box-section member comprising top and bottom walls 16 and 18 and spaced side walls 20 extending therebetween. Intermediate the side walls 20 are a pair of spaced inboard and outboard walls 22 and 24, extending transversely of the bolster intermediate the top and bottom walls 16 and 18 thereof.

A friction shoe 26 is recessed in each side of the bolster in frictional engagement with a wear plate or liner 28 (Figures 1 and 2) secured in any convenient manner to the associated truck column 6. The friction shoe is urged against the liner by a spring 30 extending through an opening in the adjacent bolster side wall 20 and compressed against a wedge 32 snugly fitted between the bolster walls 22 and 24 and between the top and bottom bolster walls 16 and 18, each of said walls being preferably provided with a suitable pad adapted to afford a seat for the wedge 32. A central wedge 34 extends between the wedges 32 in complementary V-shaped face engagement therewith along surfaces sloping toward the respective columns 6, said wedge 34 extending through an opening 36 in the top wall of the bolster and being provided with an eye or loop portion 38 adapted for the reception of a key or pin 40 engaged at opposite ends thereof with a U-shaped clamp or tie member 42 which extends over a horizontal web 44 (Figure 3) of the compression member 2. Thus the central wedge member 34 is interlocked against substantial relative vertical movement with respect to the side frame compression member 2 but is accommodated relative horizontal movement with respect thereto during slight movements of the bolster between the columns 6.

The wedge member 34, as shown in detail in Figures 6 and 7 and as above noted, is provided at each side thereof with a V-shaped sloping wedge face 45 adapted for complementary engagement with a complementary face 46 on one side of the associated wedge 32. The wedge 32 is shown in detail in Figures 8 to 10 inclusive, and is formed on its opposite side with a boss or lug 48 adapted for reception within the associated spring 30 to position the same, said spring also being positioned by a boss or lug 50 on the associated friction shoe 26.

As will be clearly seen in Figures 1 and 4, each shoe is provided on the bottom thereof with a lug 52 projecting through a complementary slot 54 in the bottom wall 18 of the bolster, said lug 52 projecting slightly below the bottom surface of the wall 18 until the bolster 10 is seated on a spring plate 57 (Figure 1) mounted on the springs 12, thereby urging the shoe against the wall 16 and preventing vertical movement of the shoe relative to the bolster inasmuch as the shoe is snugly confined between the spring plate 57 and the top wall 16 of the bolster. If desired, a block of resilient material (not shown) may be interposed between each lug 52 and the plate 57.

In assembling my novel ride control truck, the wedges 32 are inserted intermediate the bolster walls 22 and 24 and pushed back toward the longitudinal center line of the bolster. The shoe-actuated springs 30 are then inserted through the openings in the bolster side walls 20 and are seated against the wedges 32. The friction shoes 26 are then placed in assembled relationship against the springs 30 and are retained against the bolster side walls 20 by any suitable means (not shown). The bolster is then entered in the bottom of the bolster opening 8 and is elevated to the position illustrated in Figure 1. The central wedge 34 is then inserted through an opening 56 in the bottom wall 18 of the bolster and is urged upwardly until the eye portion 38 engages the web 44 of the side frame compression member 2. The U-shaped clamp 42 is then secured to the eye portion 38 by the key 40. The bolster-supporting spring group, including the springs 12 and the spring plate 57, is then inserted at the bottom of the bolster opening 8 and the bolster is lowered to assembled relationship as shown in Figure 1. The shoes 26 are then released so that the springs 30 are effective to urge the shoes against the friction plates 28.

It may be noted that the U-shaped clamp member 42 may be permanently assembled with the side frame, as by welding one depending leg of the member 42 to the horizontal web thereof after said web has been inserted over the side frame web 44.

It will be apparent that if desired, the shoes 26 and associated openings in the bolster side walls 20 may be eliminated, and the springs 30 may be compressed between the wedges 32 and the side walls 20.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a railway car truck, a side frame comprising a box-section compression member and spaced columns, said compression member having spaced side webs and top and bottom chords, spring means on said frame between said columns, a spring plate supported on said spring means, a hollow bolster seated on said plate and comprising top and bottom walls and spaced inboard and outboard walls, vertically aligned openings in said top and bottom walls between said inboard and outboard walls, a wedge member extending into said bolster through an opening in said top wall, a U-shaped clamp looped over said bottom chord and having portions at opposite ends thereof extending downwardly through said bottom chord, a rigid element extending transversely of said bolster through said portions and through an opening in the upper end of said wedge member securing said wedge member to said bottom chord against vertical movement relative said frame, said opening in said wedge member and said element being dimensioned to accommodate horizontal movement of said wedge member with said bolster, upwardly sloping V-shaped surfaces on opposite sides of said wedge member, wedge elements in said bolster at opposite sides of said wedge member and in complementary wedge engagement with said wedge surfaces and in flat face engagement with a downwardly facing substantially horizontal surface on the top wall of the bolster, friction shoes in said bolster one adjacent each column, and a spring between each shoe and adjacent wedge element urging the shoe against the associated column and the wedge element against said wedge member and said bolster surface, said shoes extending through said bottom wall and being tightly confined between said plate and said top wall, said plate closing said opening in said bottom wall.

2. In a railway car truck, a side frame comprising tension and compression members and spaced columns defining a bolster opening, said compression member comprising a substantially horizontal web disposed at the upper end of said opening, a U-shaped clamp having a portion overlying said web and having spaced end portions embracing said web and extending therebelow into the upper end of said opening, a vertically disposed wedge member extending at its upper end between said spaced end portions of said clamp and having a flat surface at its upper end seated against a flat bottom surface of said web, a pin extending longitudinally of said frame substantially parallel to said web and projecting through openings aligned longitudinally of the frame in said end portions and said upper end of said wedge, whereby said wedge is accommodated movement longitudinally of the frame, said wedge having wedge surfaces at opposite sides thereof facing respective columns and converging toward the upper end of said wedge, a bolster extending into said opening and having spaced top and bottom walls with vertically aligned apertures therethrough receiving the lower end of said wedge, a pair of wedge elements confined between said bolster walls at opposite sides of said wedge and in complementary engagement with respective wedge surfaces and in engagement with the top wall of the bolster, shoes at opposite sides of the bolster confined between said walls and in engagement with respective columns, spring means compressed between each shoe and adjacent wedge element, each shoe having a lug at its bottom edge extending through a slot in said bottom bolster wall slightly below the bottom side of said bottom wall, a plate seated against the bottom side of said bottom wall and the lugs of said shoes, said shoes having flat face engagement at their top edges with the bottom side of said top wall, and resilient means compressed between said tension member and said plate.

3. In a railway car truck, a side frame comprising tension and compression members and spaced columns defining a bolster opening, a bolster spring-supported from said tension member in said opening, and means for controlling relative movements between said bolster and frame and contributing to the support of said bolster from said compression member comprising a wedge extending generally vertically into said bolster opening and slidably connected at its upper end to said compression member for relative horizontal movement, upwardly converging wedge surfaces at opposite sides of said wedge, wedge elements disposed at opposite sides of the wedge in complementary engagement with respective surfaces and in engagement with a downwardly facing surface of the bolster, friction shoes carried by the bolster at opposite sides thereof and engaging respective columns, resilient means on said bolster acting to yieldingly resist vertical movement of said shoes relative to the bolster and spring means compressed between each shoe and adjacent wedge element for urging the element into engagement with the associated wedge surface and against said bolster surface and the shoe against the related column.

4. In a truck, a side frame comprising tension and compression members, a bolster extending between said members and spring-supported from the tension member, a generally vertically arranged element slidably connected to the compression member for relative horizontal movement and extending into the bolster, wedge surfaces at opposite sides of said element converging toward said compression member, means contributing to the support of the bolster from the compression member through said element and for controlling relative movements between the frame and bolster comprising wedge members disposed at opposite sides of said element in complementary engagement with respective wedge surfaces and a downwardly facing surface of the bolster and resilient means operatively associated with said wedge members and oriented to urge said wedge members in said engagement with said surfaces.

FRANK P. QUINN.

REFERENCES CITED

The following references are of record in the file of this patent:

UNITED STATES PATENTS

| Number | Name | Date |
|---|---|---|
| 716,294 | Shallenberger | Dec. 16, 1902 |
| 1,842,007 | Blattner | Jan. 19, 1932 |
| 2,073,075 | Shafer | Mar. 9, 1937 |
| 2,141,767 | Camp | Dec. 27, 1938 |
| 2,362,654 | Maatman et al. | Nov. 14, 1944 |